May 5, 1964        P. C. GUNN        3,131,971
FRAME FOR PILOT'S SEAT
Filed June 29, 1962
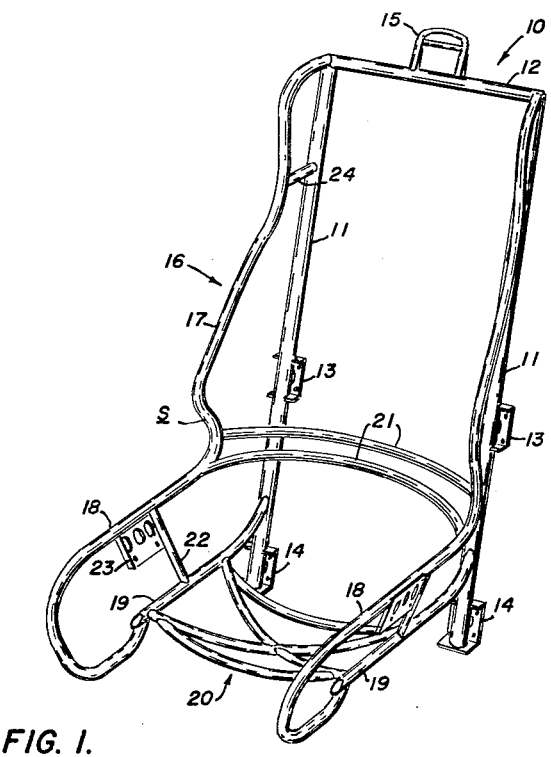
FIG. 1.
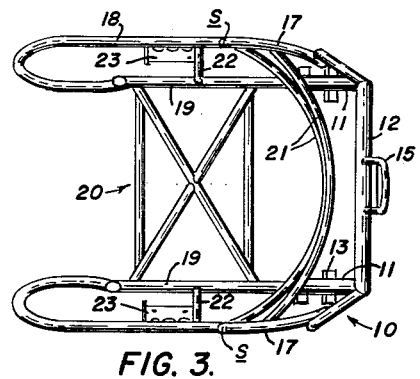
FIG. 2.      FIG. 3.
PAUL C. GUNN
INVENTOR
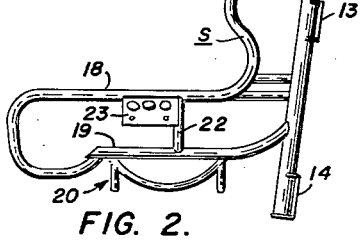
ATTORNEY United States Patent Office 3,131,971
Patented May 5, 1964

3,131,971
FRAME FOR PILOT'S SEAT
Paul C. Gunn, Fort Worth, Tex., assignor to Air Laboratory Service Co., Inc., Fort Worth, Tex., a corporation of Texas
Filed June 29, 1962, Ser. No. 206,250
4 Claims. (Cl. 297—449)

This invention relates to chairs, generally, and has reference to improvements in seats for operators of vehicles, for example, pilot's seats in aircraft. While such seats are provided with cushions or other resilient supports for comfort and to reduce fatigue, it has been found that additional flexible support is desirable, particularly when the occupant's feet do not touch the floor. Even during mild undulations while in flight, a person occupying a seat with his feet on the floor subconsciously presses the floor with his feet to compensate for relative increases in gravity forces. However, a pilot with his feet on certain of the aircraft controls does not have this advantage. Accordingly, an object of the invention is to provide a pilot's seat frame construction which is flexible in part for supporting the pilot, and which flexible construction is in addition to cushions ordinarily provided for that purpose.

An axiom of aircraft design is that all parts must be of light weight without unduly sacrificing strength. Another object of the invention is to provide a frame for a pilot's seat wherein spring means comprise a part of the frame itself without the addition of auxiliary springs or the like.

A further and particular object of the invention is to provide a lightweight and unusually strong frame for pilot's seats, and which strength is derived, in part, by means of a compound bend in each of the side rails between the seat supports and the back portions of the side rails.

These and other objects will become apparent from the following description and the accompanying drawings, wherein:

FIGURE 1 is a perspective view of a frame for a pilot's seat in accordance with the invention.

FIGURES 2 and 3 are, respectively, side elevation and top plan views of FIGURE 1.

The exemplary form of the invention shown includes a back frame 10 having generally vertical parallel side members 11 which are connected at their upper ends by a cross member 12. Except for certain plates to be described, all parts are of tubular material and are assembled by welding. On the back of each side member 11 at and near the lower ends thereof there are upper and lower mounting plates 13 and 14 for attaching the herein described frame to a vertically adjustable seat supporting frame, not shown. A vertically projecting shoulder strap guide 15 is shown on the upper center of the member 12, but since the guide does not comprise a part of the invention it is not herein described in detail.

The primary feature of the invention resides in the side rails 16 which are connected with the upper corners of the back frame 10, extend forwardly and are curved downwardly to provide back supports 17; the lower portions of the back supports 17 are curved downwardly and rearwardly and downwardly and forwardly, as designated at S, and thence horizontally and forwardly to provide seat supports 18; the forward portions of the seat supports 18 are curved downwardly and rearwardly, thence slightly upwardly where they are joined with the forwardly extending ends of tubular horizontal side rail supports 19, the rear ends of which are connected with the vertical back frame members 11.

The seat supports 18 of the side rails 16 are maintained parallel with each other by a cross frame 20 connected between the rail supports 19 and rearwardly disposed arcuate spacer bars 21 connected, one above the other, with lower portions of the compound curves S. As particularly shown in FIGURE 3, the spacer bars 21 do not touch the back frame 10. It is also pointed out that neither the depending curved forward portions of the seat supports 18 nor the cross frame 20, which is concave, touch the floor, not shown.

Other details of the pilot's seat frame as shown include vertical spacer bars 22 between the side rail supports 19 and the seat supports 18, harness attaching plates 23 mounted on the seat supports 18 and spacer bars 22, and additional spacer bars 24 between the upper portions of the back frame side members 11 and the upper portions of the side rails 16. As will become apparent, the spacer bars 22 and 24 do not interfere with the operation of the invention, but have a damping effect on the spring action inherent in the described construction.

The seat supports 18 and their connected supports 19 and back supports 17 comprise a cantilever suspension for a seat or cushion mounted on said seat supports. The described construction particularly lends itself to seats and backs, not shown, of stretched fabric, but conventional cushions or pads may be used instead. The weight of the person occupying the seat tends to spring the seat supports downwardly with the connections of the side rail supports 19 with the vertical members 11 acting as fulcrums. Compression loads are transferred to the back support portions 17 of the side rails 16, and, at the same time, the compound curves S provide additional flexibility at the curvature of the occupant's spine, thus materially lending to the comfort of the occupant.

The invention is not limited to the exemplary construction herein shown and described, but may be made in various ways within the scope of the appended claims.

What is claimed is:
1. A frame for a seat comprising:
  a generally vertical back,
  elongate side rails of spring material connected with the top of said back at the sides thereof and extending forwardly and downwardly therefrom, each said side rail including
  a generally vertical back portion,
  a forwardly extending seat support portion,
  a compound curve portion connecting said seat support portion with said back portion, and
  side rail supports connecting the forwardly extending ends of said seat support portions with said back above floor level.

2. A frame for a seat as defined in claim 1, and wherein:
  said compound portion extends rearwardly where it connects with said back portion, and forwardly where it connects with said seat support portion.

3. A frame for a seat as defined in claim 1, and including:
  spacer bars between said seat support and said side rail support, and between back portion and said back support.

4. A frame for a seat comprising:
  a generally vertical back,
  elongate side rails of spring material connected with the top of said back at the sides thereof and extending forwardly and downwardly therefrom, each said side rail including
  a generally vertical back portion,
  a forwardly extending seat support portion,
  a compound curve portion connecting said seat support portion with said back portion,
  said compound curve portion extending rearwardly where it connects with said back portion, and forwardly where it connects with said seat support portion, side rail supports connecting the forwardly extending ends of said seat support portions with said back above floor level, and spacer bars between said seat support and said side rail support, and between back portion and said back support.

References Cited in the file of this patent

UNITED STATES PATENTS

| | | |
|---|---|---|
| 2,115,258 | Ferreira et al. | Apr. 26, 1938 |
| 2,291,247 | McArthur | July 28, 1942 |
| 2,485,111 | Robins | Oct. 18, 1949 |
| 2,821,245 | Meneghelli | Jan. 28, 1958 |